US012607005B1

(12) United States Patent
Vu et al.

(10) Patent No.: US 12,607,005 B1
(45) Date of Patent: Apr. 21, 2026

(54) HYDRAULIC MECHANISM AND METHOD FOR LIFTING AND LOWERING FLOOR SLABS

(71) Applicant: ICITI GmbH, Leipzig (DE)

(72) Inventors: Truong The Vu, Paralimni (CY); Ky Xuan Nguyen, Da Nang (VN); Hoang Nguyen Pham, Hanoi (VN)

(73) Assignee: ICITI GmbH, Leipzig (DE)

( * ) Notice: Subject to any disclaimer, the term of this patent is extended or adjusted under 35 U.S.C. 154(b) by 0 days.

(21) Appl. No.: 19/313,946

(22) Filed: Aug. 29, 2025

(30) Foreign Application Priority Data

Oct. 18, 2024 (VN) .............................. 1-2024-07841

(51) Int. Cl.
*E04B 1/35* (2006.01)
*B66F 3/25* (2006.01)

(52) U.S. Cl.
CPC .............. *E04B 1/3511* (2013.01); *B66F 3/25* (2013.01); *E04B 2001/3588* (2013.01)

(58) Field of Classification Search
CPC ................. E04B 1/3511; E04B 1/3527; E04B 2001/2445; E04B 2001/3588; E04G 21/14; B66F 3/25
USPC .............................................. 52/125.1, 236.3
See application file for complete search history.

(56) References Cited

U.S. PATENT DOCUMENTS 2,686,420 A * 8/1954 Yountz .................. E04B 1/3511 254/105
2,720,017 A * 10/1955 Youtz ........................ E04B 1/35 52/125.1
3,028,143 A * 4/1962 Cheskin .................. E04G 21/16 254/105
3,036,816 A * 5/1962 Stubbs .................. E04B 1/3511 254/105
3,053,015 A * 9/1962 Graham ................ E04B 1/3511 52/125.1
3,154,292 A * 10/1964 Rankin ................. E04B 1/3511 74/88
3,522,931 A 8/1970 Von Heidenstam
3,579,935 A * 5/1971 Regan ................... E04B 1/3511 254/105

(Continued)

FOREIGN PATENT DOCUMENTS

EP 3396077 A1 10/2018
FR 2739117 A1 * 3/1997 ............ E04B 1/3511

(Continued)

*Primary Examiner* — Patrick J Maestri
(74) *Attorney, Agent, or Firm* — Bayramoglu Law Offices LLC

(57) ABSTRACT

The provided is a hydraulic mechanism for lifting and lowering floor slabs that operates by assembling (combining) the upper stories at a low elevation (above ground floor slab level), then lifting them to the designed elevation by means of specialized lifting devices. The provided includes a combination of features, including: building columns serving as lifting columns, with their lower ends remaining free on the foundation during the lifting process; guiding structures for the lifting columns, including column openings formed in the floor slabs, the shapes and dimensions of which correspond to those of the columns; and sliding assemblies between the columns and the column openings, configured to guide and maintain the columns in a vertical position throughout the lifting process.

3 Claims, 19 Drawing Sheets

(56) References Cited

U.S. PATENT DOCUMENTS

| | | | | | |
|---|---|---|---|---|---|
| 3,722,169 | A * | 3/1973 | Boehmig | E04B 1/3511 52/125.1 |
| 3,831,902 | A * | 8/1974 | Vanderklaauw | E04B 1/3505 254/105 |
| 3,974,618 | A * | 8/1976 | Cortina | E04G 21/167 414/12 |
| 4,301,630 | A * | 11/1981 | Burkland | E04B 1/3511 52/125.1 |
| 2019/0169834 | A1* | 6/2019 | Marshall | E02D 27/12 |
| 2023/0151625 | A1 | 5/2023 | O'Connor et al. | |
| 2023/0374775 | A1* | 11/2023 | Stewart | E04B 1/3511 |

FOREIGN PATENT DOCUMENTS

| | | | | |
|---|---|---|---|---|
| GB | 854175 | A | 11/1960 | |
| GB | 1388500 | A * | 3/1975 | E04G 13/02 |
| GB | 1529502 | A | 10/1978 | |

* cited by examiner

HYDRAULIC MECHANISM AND METHOD FOR LIFTING AND LOWERING FLOOR SLABS

CROSS-REFERENCE TO THE RELATED APPLICATIONS

This application is based upon and claims priority to Vietnamese Patent Application No. 1-2024-07841, filed on Oct. 18, 2024, the entire contents of which are incorporated herein by reference.

TECHNICAL FIELD

The present invention relates to the field of prefabricated residential building construction, and more particularly to a hydraulic mechanism and a method for lifting and lowering floor slabs to facilitate the handling and assembly of related components during the prefabricated construction of residential buildings.

BACKGROUND

To date, numerous inventions and applications involving hydraulic methods for the prefabricated construction of residential buildings have been implemented worldwide. A fundamental principle of the known methods is that: the upper components of a building are combined (assembled) at a low elevation and subsequently lifted to the designed elevation using lifting devices such as hydraulic jacks, winches, hoists, screw-nut mechanisms, etc. These lifting methods are all based on the principle that the bases of lifting columns must be rigidly fixed to the foundation. This rigid fixation of the lifting columns to the foundation is to ensure the following requirements: (i) The bases of the lifting columns are not freely displaced on the foundation surface; (ii) The bodies of the lifting columns remain perpendicular to the foundation surface and vertical during the lifting process, and (iii) The entire lifting columns are sufficiently stable and capable of withstanding dynamic loads throughout the construction and erection of the lifted objects until the target structure is completed.

Problem to Be Solved

As shown in FIG. 1 and FIG. 2, a conventional mechanism for lifting and lowering floor slabs comprises: a foundation 1, lifting columns 2, floor slabs 3, lifting devices 5. According to a known building erection method, the lifting columns 2 need to be rigidly fixed to the foundation 1, vertically aligned and sufficiently rigid. This means that:

The connection 21*cd* of each lifting column 2 and the foundation 1 must be a fixed connection (which is capable of withstanding displacement forces and moments in all directions). If this requirement cannot be met, the lifting columns may topple during the lifting process.

The lifting columns 2 must be vertically aligned, forming the perpendicular alignment Gcd with the foundation surface, and the column heads 23 must be inserted into the openings 32 formed in the floor slabs 3 (that is, Rcd must be equal to Lcd, where Rcd is the distance between two lifting columns 2, measured from the center of each lifting column 2; and Lcd is the distance between two openings 32, measured from the center of each opening 32). This forms a clearance K32*cd* between the lifting columns 2 and the openings 32 (FIG. 22). If the lifting columns 2 are not vertically aligned, a very large moment will be generated at their bases, due to the considerable weight of the entire story (or several stories) during the lifting process, especially when the lifting height is significant. This moment may compromise the connection between the lifting columns and the foundation, causing the lifting columns to topple. Furthermore, if the lifting columns 2 are not vertically aligned, it becomes difficult to ensure parallelism among them. As a result, during the lifting process, the point of application of the lifting force on the floor slabs 3 will shift, leading to significant damage to both the floor slabs 3 and the lifting columns 2 (depending on the specific lifting method and lifting device used).

The lifting columns 2 must have sufficient rigidity, as each lifting column is generally quite tall and lacks intermediate supports along its height. Without adequate rigidity, the lifting columns 2 may become unstable due to the lifted load.

It is difficult for the lifting columns to meet all three aforementioned requirements because, during on-site erection and hoisting by a crane, a considerable amount of time is required to align the columns vertically. Furthermore, due to the large number of lifting columns, the total erection time for the lifting columns is substantial.

To ensure the rigidity of the lifting columns, the foundation must be highly robust (significantly more robust than that required for conventional use), and it must be constructed well in advance to meet the aforementioned performance requirements.

It can be seen that the rigid fixation and vertical alignment of the lifting columns to the foundation during the building erection process, according to the prior art, is a highly complex and time-consuming task. It requires a large number of highly skilled erection workers and leads to significant construction costs. Moreover, if the lifting columns rigidly fixed to the foundation fail to achieve the required verticality, column jamming may occur during the lifting process, adversely affecting construction quality and the quality of the building.

Proposed Solution

Through research and experimentation, the inventors have developed a method for the prefabricated construction of residential buildings using a novel and breakthrough approach that departs from the traditional principles described above. According to the invention, (i) the bases of the lifting columns do not need to be fixed to the foundation but remain free; (ii) a horizontal connection technique is employed to define the vertical connection; (iii) the objects to be lifted are used to position and define the lifting columns; and (iv) these objects serve as key components of the lifting mechanism. This method is characterized by the precise connection of specially designed technical elements in combination with a defined lifting procedure.

SUMMARY

An object of the present invention is to eliminate the aforementioned disadvantages of the prior art, thereby achieving high efficiency in terms of construction time and cost.

To achieve this object, the invention provides a method for the prefabricated construction of residential buildings, wherein the upper stories are assembled (combined) at a low elevation (above ground floor slab level) and then lifted to the designed elevation by means of specialized lifting devices. The invention comprises a combination of features, including: building columns serving as lifting columns, with their lower ends remaining free on the foundation during the lifting process (thereby forming a bearing-type connection 21*td* between the columns and the foundation); guiding structures for the lifting columns, comprising column openings formed in the floor slabs, the shapes and dimensions of which correspond to those of the columns; and sliding assemblies between the columns and the column openings, configured to guide and maintain the columns in a vertical position throughout the lifting process.

Applications and Effects of the Invention

The present invention delivers outstanding economic and technical advantages, clearly distinguishing it from conventional prefabricated construction methods for residential buildings. This really represents a revolutionary advancement in construction in terms of productivity and cost, as demonstrated below:

- Much faster construction: Because this method shifts many operations from the construction site to the factory. The lifting columns does not require time-consuming precise positioning on the foundation.
- Construction site space savings: Because the components are pre-manufactured with high precision at the factory, subsequently transported to the site, and directly assembled into the building structure.
- Foundation cost savings: Because this method operates on the principle that the foundation bears vertical forces from the column bases and does not generate moments during the lifting process.
- Cost savings: Achieved by optimizing multiple operations, especially through faster construction time and reduced labor requirements.
- Superior worker safety: Enabled by performing construction work at low heights.
- Enhanced environmental performance: Resulting from minimized dust and noise emissions at the construction site.

The present invention is applied not only in the narrow scope of "prefabricated residential building construction" but can also be extended to the broader field of "lifting construction". For such extension to be successful, it is essential to synchronize the connection between the lifting mechanism and the objects to be lifted, forming a specific lifting process.

The economic and technical effects analyzed above demonstrate that the present invention offers a comprehensive solution, providing many superior benefits for the prefabricated construction of residential buildings. It represents a breakthrough that promises a revolution in productivity, cost and pricing in the construction industry.

Further specific features of the present invention will become more apparent through the following description of the embodiments with reference to the accompanying technical drawings.

DETAILED DESCRIPTION OF THE EMBODIMENTS

Figure 1:
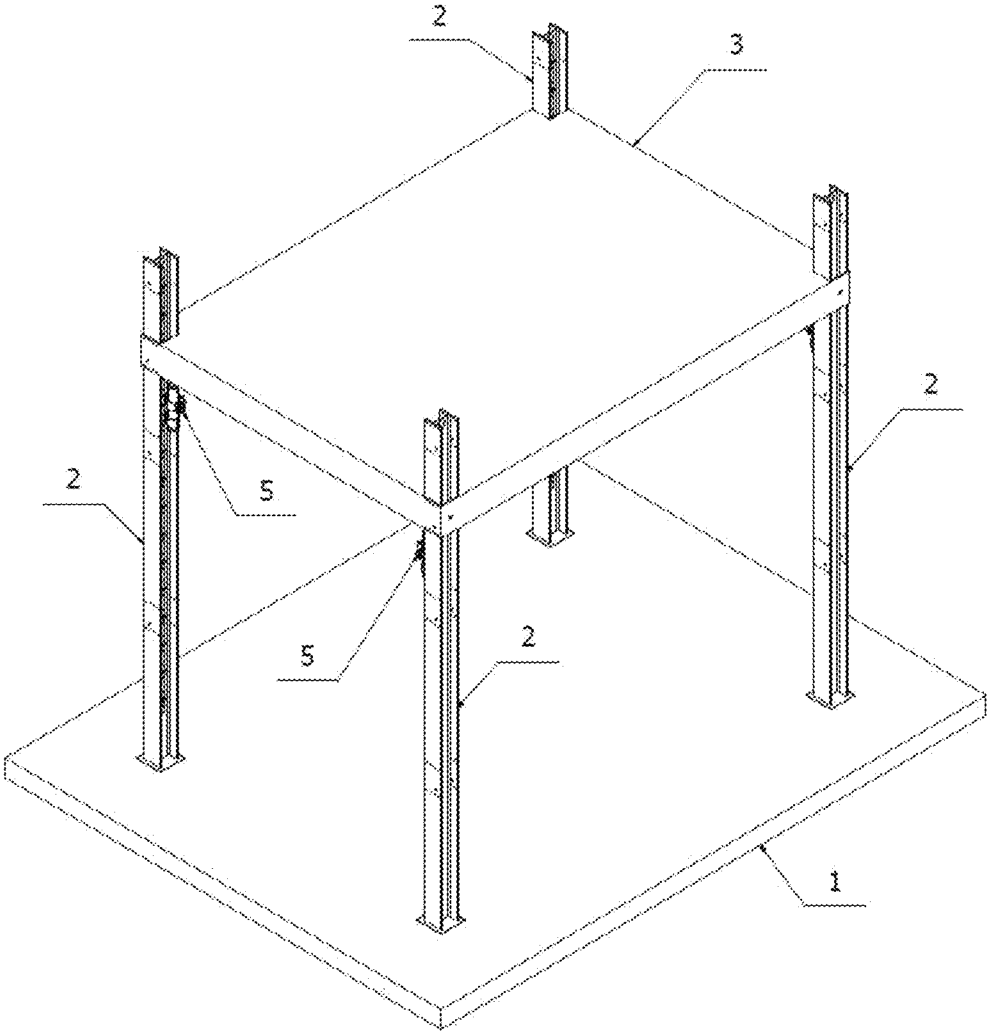
FIG. 1 (Prior Art)
FIG. 1 is a perspective view of a lifting mechanism according to a conventional embodiment in the lifted state.
Figure 2:
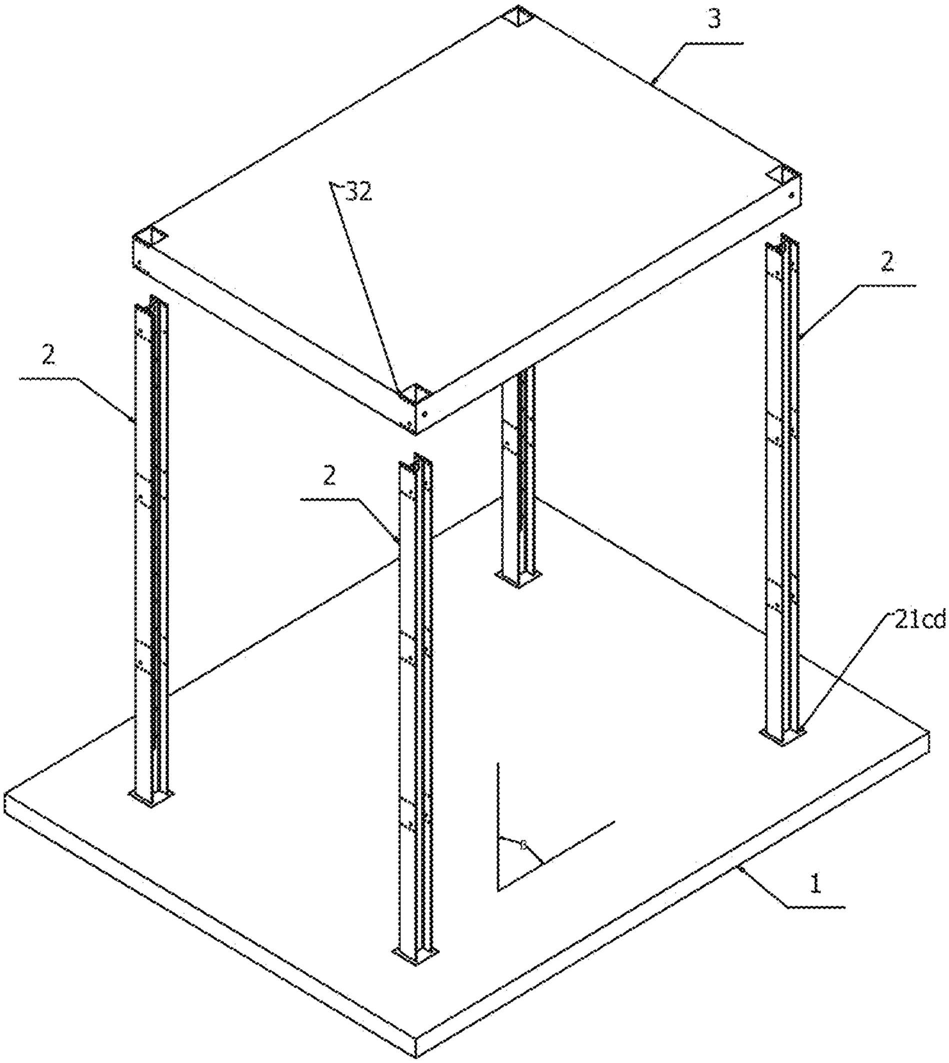
FIG. 2 (Prior Art)
FIG. 2 is a perspective view illustrating the requirements for a lifting mechanism according to a conventional embodiment.

The following description of the lifting mechanism according to preferred embodiments of the present invention is provided for illustrative purposes only and is not intended to limit the scope of application or use of the invention.

The description of the embodiments, illustrated according to the principles of the invention and intended to be read with reference to the accompanying drawings, is considered as part of, or the entirety of the description. In the description of the embodiments disclosed herein, any reference to direction or orientation is provided merely for descriptive convenience and is not intended to limit the scope of the invention in any way. Relative terms such as “beneath”, “above”, “horizontal”, “vertical”, “over”, “below”, “upward”, “downward”, “top” and “underside” as well as derivatives thereof (e.g., “horizontally”, “downwardly”, “upwardly”, etc.) shall be understood with reference to the direction or orientation described herein or as illustrated in the accompanying drawings. These relative terms are for descriptive convenience only and do not require that a device be constructed or operated in any particular direction or orientation unless explicitly stated. Terms such as “attached”, “fixed” and similar expressions refer to relationships in which structures are secured or connected together either directly or indirectly through intermediate components. In addition, the features and advantages of the invention are illustrated by way of example with reference to exemplary embodiments. Accordingly, the invention will not be limited to these exemplary embodiments, which merely illustrate several possible non-limiting combinations of features that may exist independently, or in various other combinations. The scope of the invention is defined by the appended claims.

The lifting mechanism according to the invention comprises:

A concrete foundation and ground floor slab 1 cast in situ as a monolithic unit (hereinafter referred to as a the “Foundation-floor slab”). Embedded in the Foundation-floor slab at the column locations are connection elements for subsequent attachment to the columns (e.g., foundation bolts, steel flanges, etc.);

Floor slabs 3 contain openings 32 through which the building columns (which also serve as building lifting columns) 2 pass. These openings 32 are referred to as column openings.

The design of the column openings and the columns is critically important. The sectional dimensions (cross-section) of the column openings must be selected so that the clearances between the columns and the column openings are as small as possible, in order to ensure the perpendicularity of the columns to the floor slabs. This arrangement allows the column openings to effectively guide the columns and reduce frictional forces between the columns and the column openings (caused by the hydraulic jacks applying eccentric pushing forces with respect to the columns). However, if these clearances are too small, the columns may become jammed in the openings, due to manufacturing tolerances of both the columns and the column openings. These clearances are most preferably in the range of 1.5-3 mm.

The depth of the column openings is also critically important and must be determined in conjunction with the clearances between the columns and the column openings. The depth of a column opening corresponds to the length of a column segment inserted into the opening. This depth affects the moment-resisting capacity of the joint between the columns and the floor slabs, which must be treated as a rigid fixed connection. The depth H3 of the openings 32 must be compatible with the width B32 of the openings 32, or with the width of the columns 2, so that the bending moment acting on the columns at the locations of the openings 32 does not cause failure of the walls of the openings 32. Most preferably, the H3/B32 ratio is in the range of 1.5-2.

Figure 3:
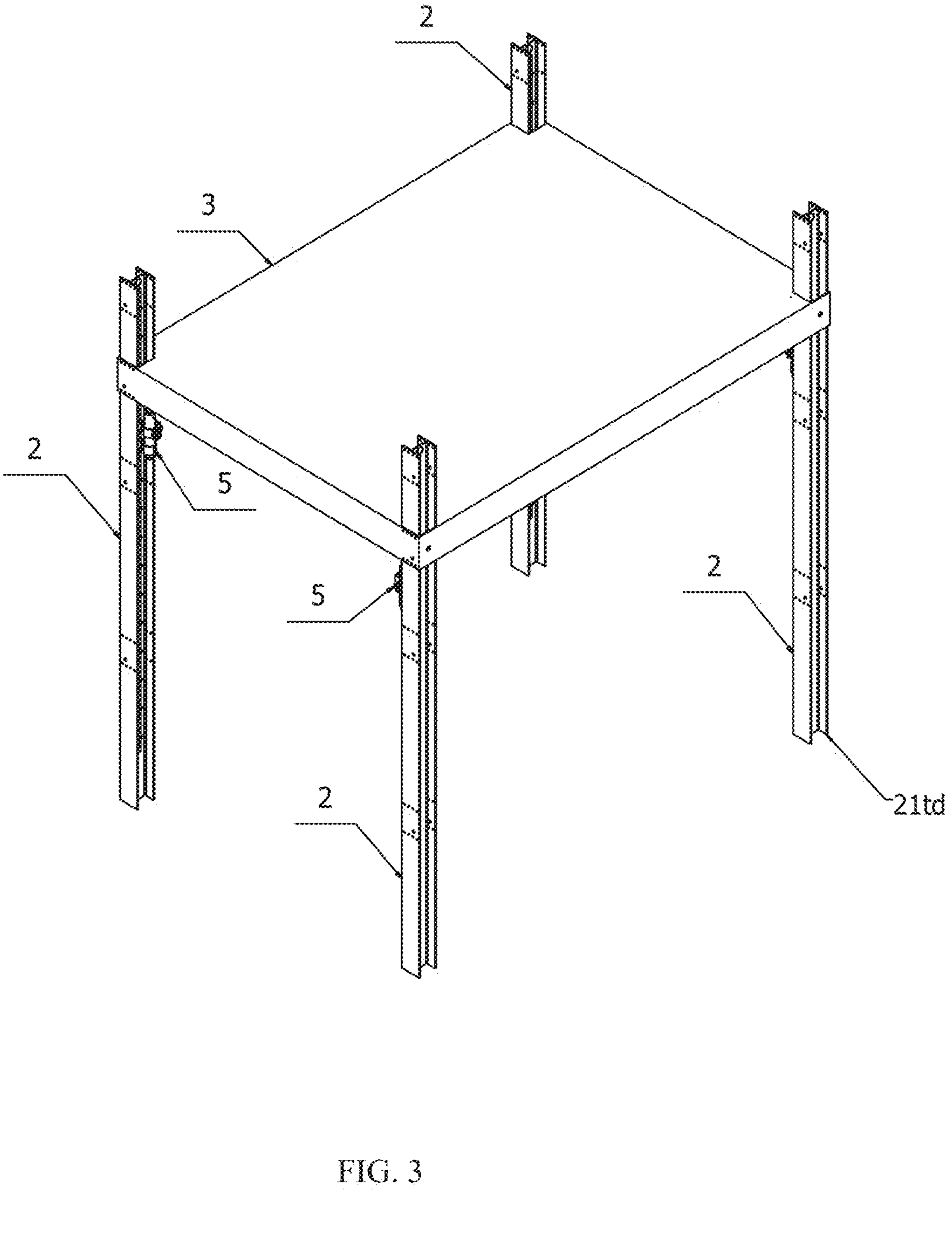
FIG. 3 is a perspective view illustrating the lifting principle of a lifting mechanism according to an embodiment of the present invention.
Figure 4:
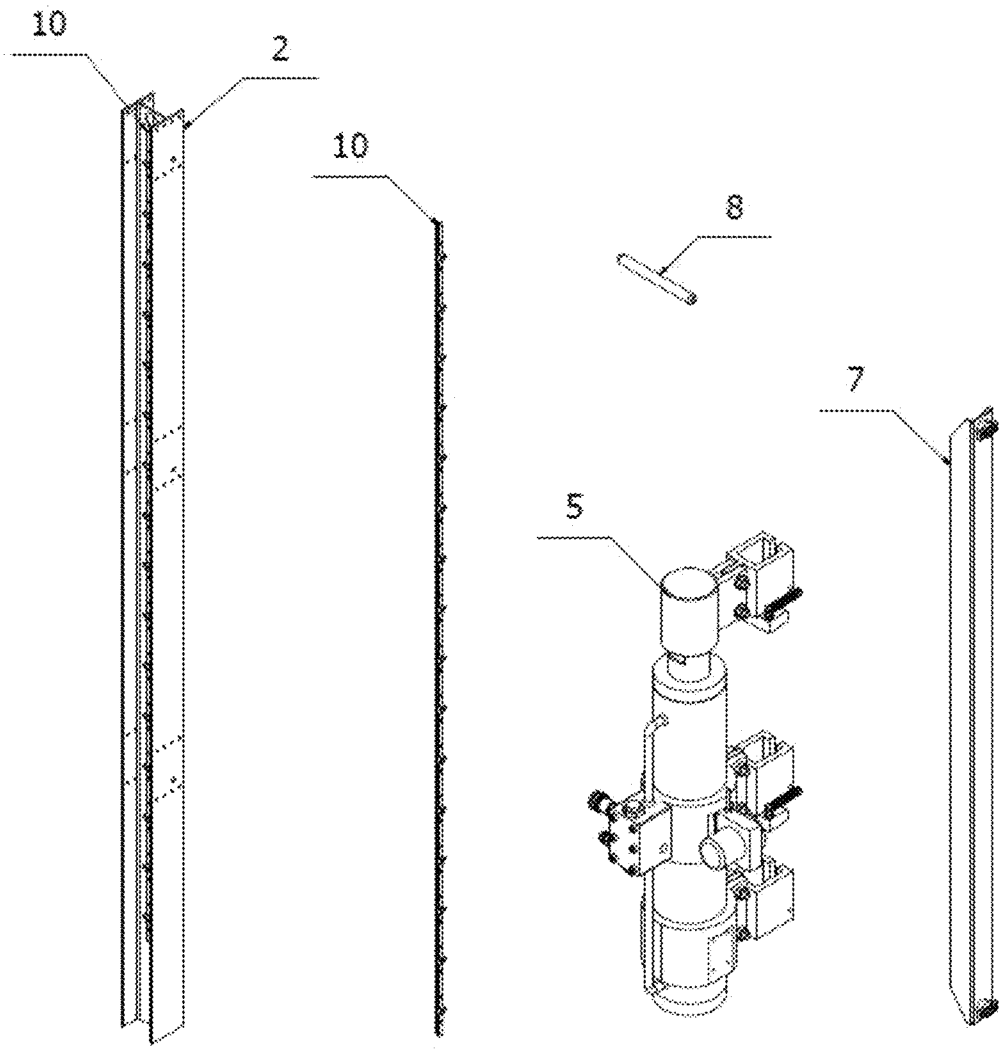
FIG. 4 is an exploded view illustrating the basic component assemblies of the lifting mechanism according to an embodiment of the present invention.
Figure 5:
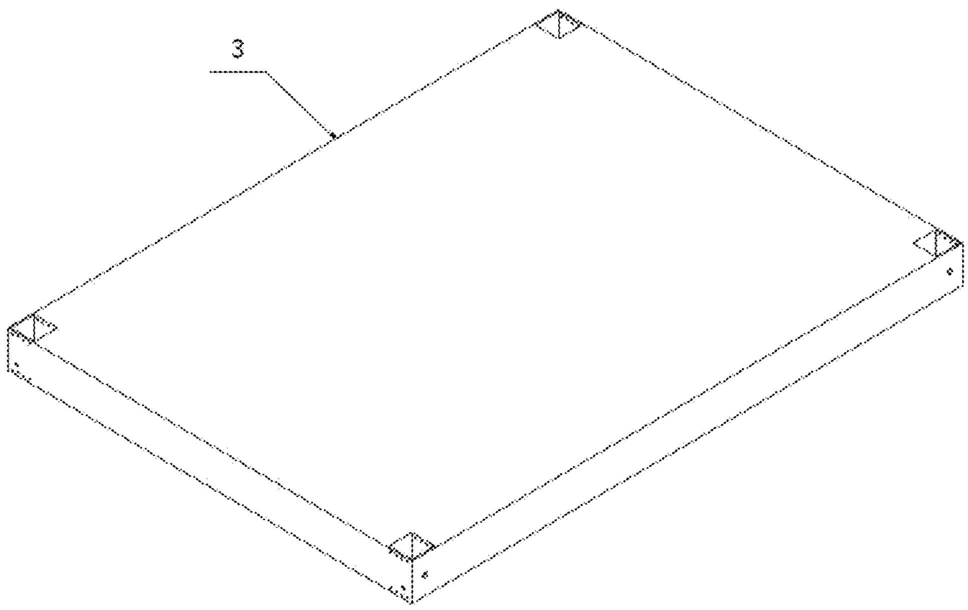
FIG. 5 is a perspective view illustrating a floor slab.

Provided that the depth of the column openings and the clearances between the columns and the column openings are properly selected, it is not necessary to rigidly fix the columns to the foundation during the building erection process (FIG. 3).

The floor slabs 3, when prefabricated at the factory, should be integrated with as many mechanical, electrical and plumbing (MEP) systems as possible (e.g., heating, ventilation and air-conditioning (HVAC) ducts, certain electrical devices, junction boxes, etc.) to reduce on-site construction time.

The columns 2, made of steel, also serve as lifting columns. These columns are provided with holes or members for mounting lifting rails for the specialized lifting devices 5, as well as openings for connection to the floor slabs.

The specialized lifting devices are self-climbing hydraulic jacking systems. These devices ascend along the lifting rails mounted on the columns and bear against the underside of the floor slabs to elevate them. The lifting devices are equipped with a control system configured to control the upward or downward strokes of the lifting devices and to synchronize the strokes of the lifting devices.

Each column (i.e. lifting column) is equipped with a hydraulic jack that bears against the underside of the uppermost floor slab of the building to lift that slab, thereby simultaneously raising the next lower slabs.

Since the floor slabs 3 are not fixed to the columns 2 during construction, they are interconnected by steel bars 7 having quick-connect joints for attachment to the floor slabs 3. As the uppermost floor slab moves upwardly during the lifting process, the lifting force is transmitted through these steel bars to the floor slab immediately below, which in turn transmits the lifting force further down to the next lower floor slab. Although these steel bars are primarily subjected to tensile forces during lifting, they are also designed to withstand compressive forces (i.e., the weight of the upper stories) in case of hydraulic jack failure. Accordingly, these steel bars 7 are referred to as “floor slab struts” 7.

Figure 6:
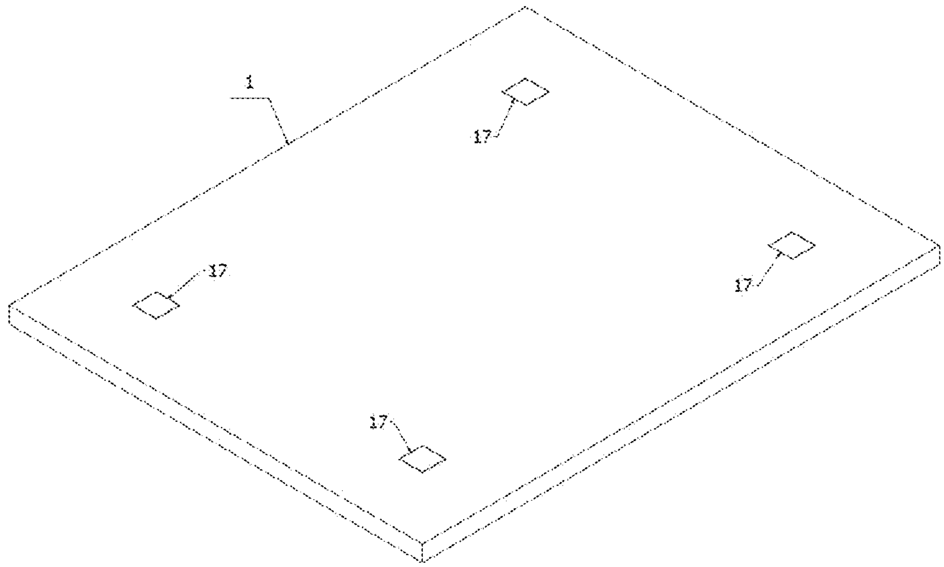
FIG. 6 is a perspective view illustrating the concrete pouring step for a foundation according to an embodiment of the present invention.
Figure 7:
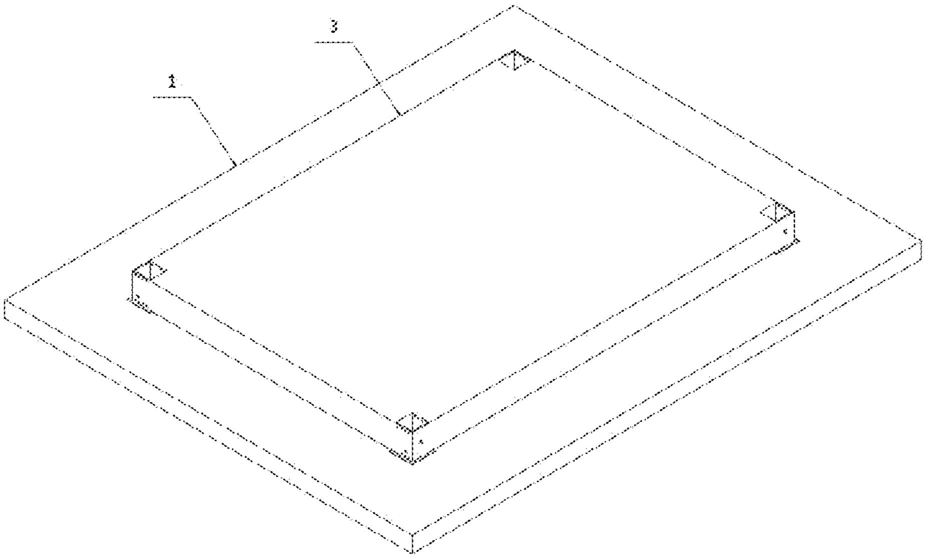
FIG. 7 is a perspective view illustrating the installation of the floor slab of the second story on the foundation according to an embodiment of the present invention.
Figure 8:
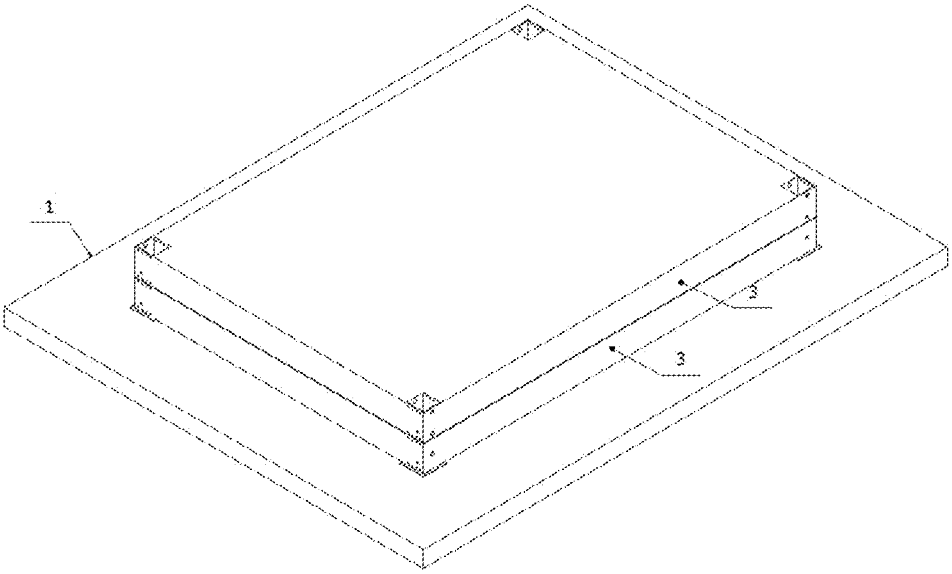
FIG. 8 is a perspective view illustrating the installation of the next floor slab on top of the lower floor slab according to an embodiment of the present invention.
Figure 9:
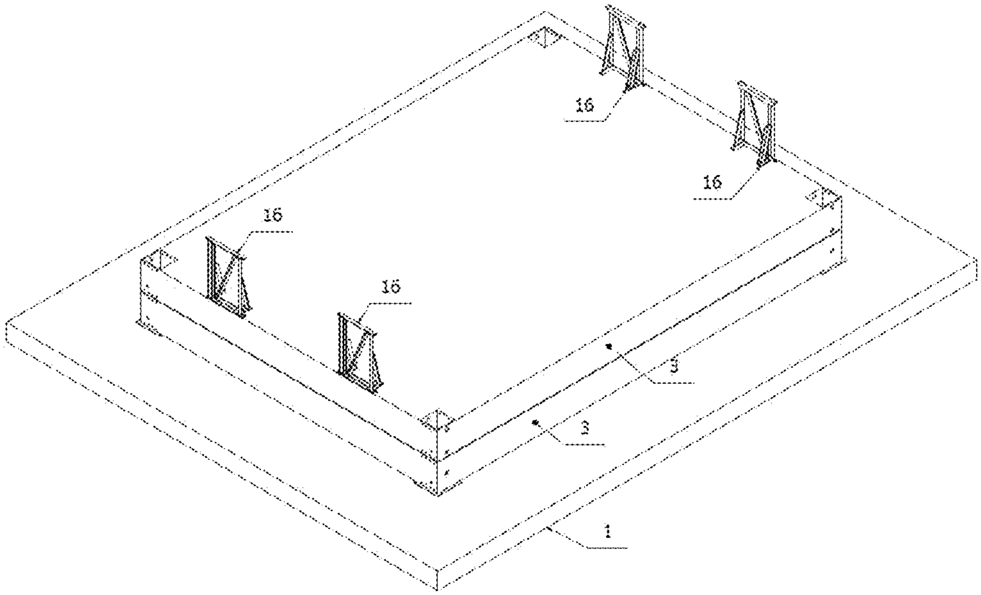
FIG. 9 is a perspective view illustrating the installation of the roof floor slab support frames onto the attic floor slab according to an embodiment of the present invention.
Figure 10:
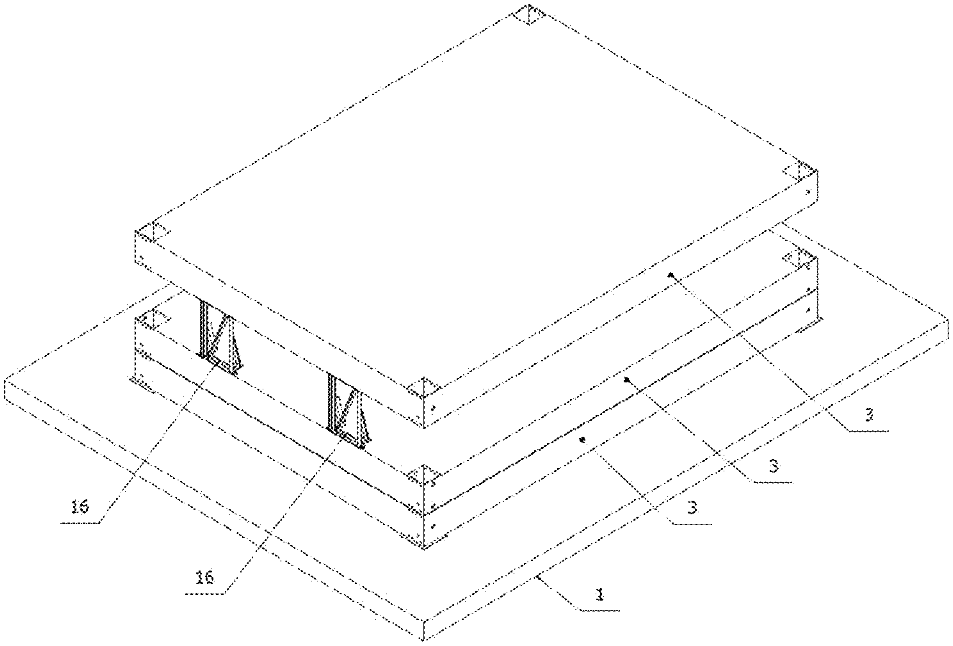
FIG. 10 is a perspective view illustrating the installation of the roof floor slab onto the roof floor slab support frames according to an embodiment of the present invention.

The components of the present invention are described and referenced by numerals in the drawings below:

Description of the Erection Process According to the Present Invention (FIGS. 6 to 18):

The foundation and ground floor slab (the Foundation-floor slab) 1 is cast in place with concrete (FIG. 6). To reduce the waiting time required for the concrete to reach its specified strength, a rapid-setting admixture is employed.

The floor slabs 3, pre-fabricated at the factory, are directly assembled on top of the Foundation-floor slab (FIGS. 7 to 10). The floor slabs are assembled in an upward sequence and stacked one on top of the other: the floor slab of the second story is placed directly on the Foundation-floor slab, the floor slab of the third story is placed directly on that of the second story, and so on. The roof floor slab is also placed on top of the next lower floor slab, but via steel support frames 16, so as to create sufficient space for the installation of the lifting devices (i.e., enough height to accommodate the hydraulic jacks 5).

The floor slabs 3 are stacked such that the column openings in the floor slabs are concentrically aligned with one another and with the designated column positions on the foundation 1.

Figure 11:
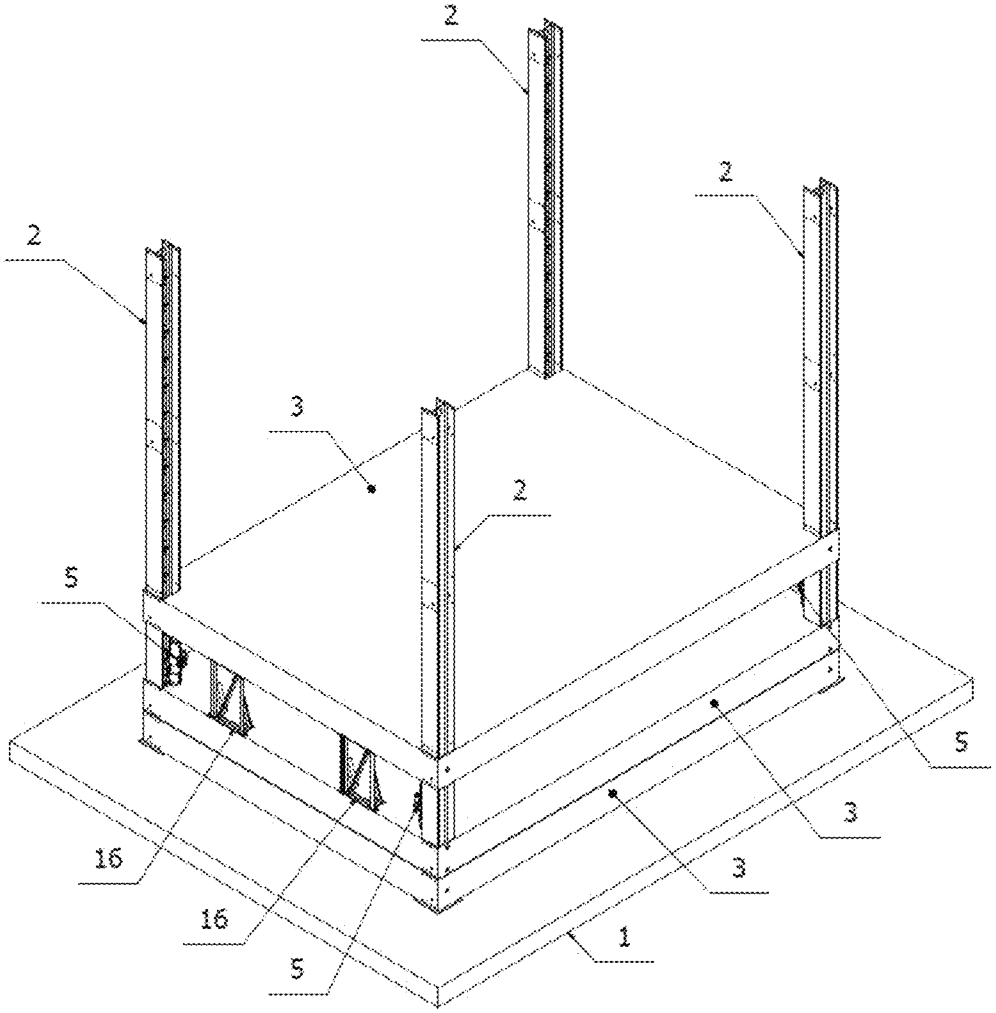
FIG. 11 is a perspective view illustrating the insertion of the columns into the column openings formed in the floor slabs according to an embodiment of the present invention.

The lifting rails 10 are pre-installed on the columns 2. A crane is used to place the columns 2 into the column openings on the floor slabs 3 until the lower ends of the columns 2 rest on the surface of the Foundation-floor slab 1. There is no need to rigidly fix the lower ends of the columns to the Foundation-floor slab during construction. The columns are only permanently secured to the Foundation-floor slab only after the structure has been lifted to the designed elevation (FIG. 11).

Figure 13:
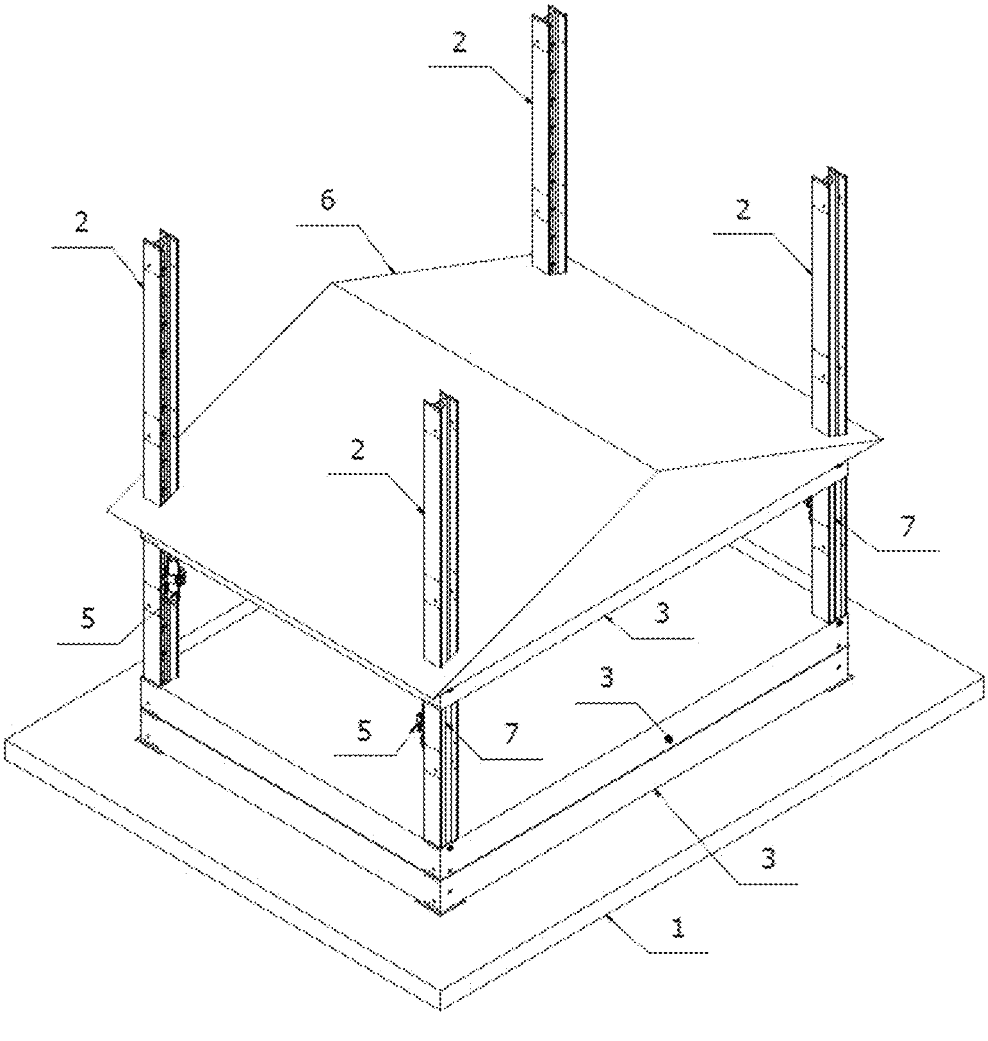
FIG. 13 is a perspective view illustrating the further lifting of the roof floor slab and stopping it at a predetermined height for installing the floor slab struts to connect the two adjacent floor slabs according to an embodiment of the present invention.

The hydraulic jacks 5 are inserted into the space between the roof floor slab and the next lower floor slab (FIG. 13). The jacks are mounted to engage with the lifting rails 10. Hydraulic hoses and control cables are connected to a control cabinet. The piston rod heads are then controlled to rest on the underside of the roof floor slab. The stroke indicators of the hydraulic jacks are reset to zero.

Figure 12:
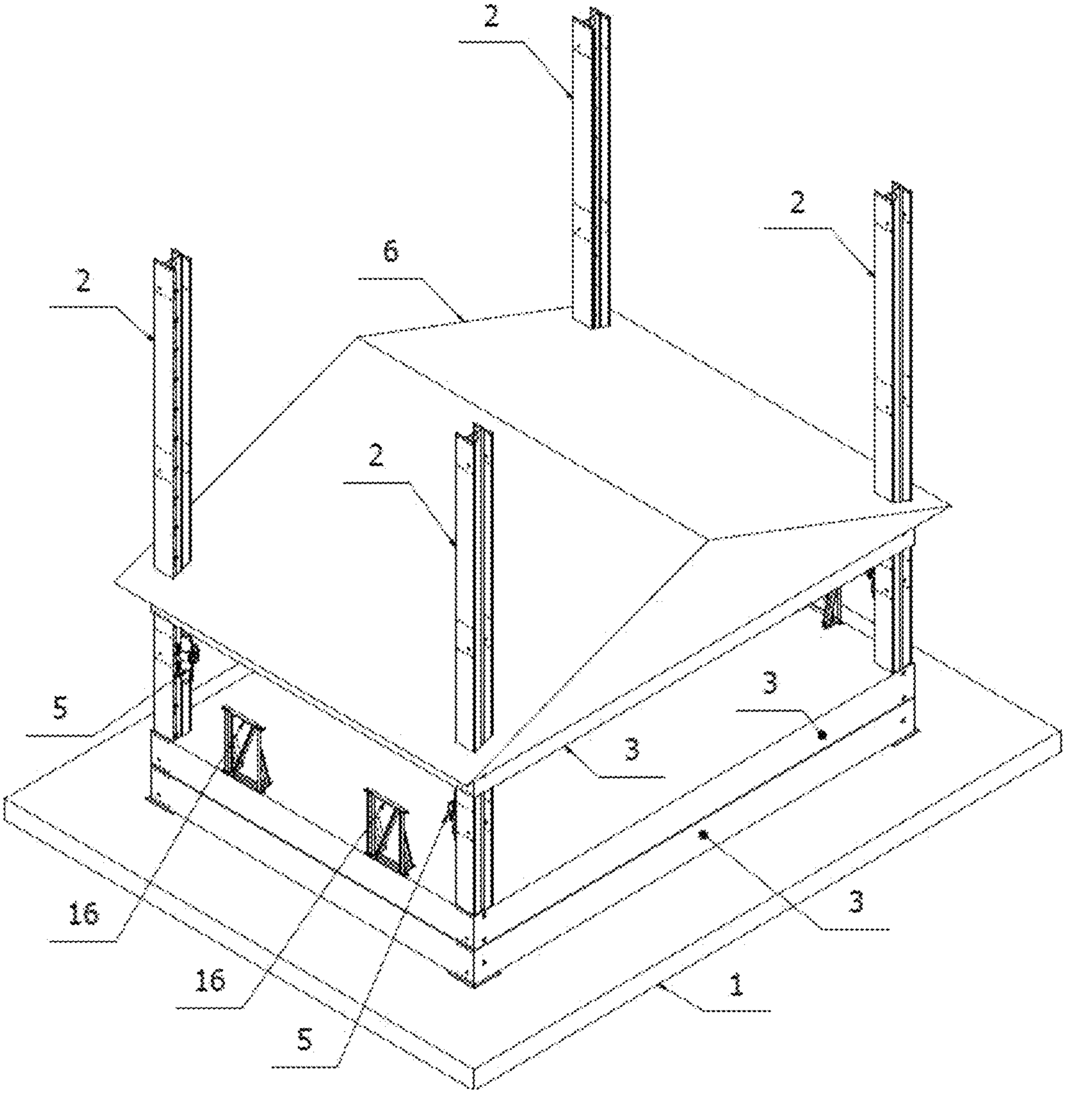
FIG. 12 is a perspective view illustrating the lifting of the roof floor slab (where applicable, if a roof is required, it is installed on the floor slab prior to lifting), and stopping it at an appropriate height for the installation of components beneath the roof floor slab according to an embodiment of the present invention.
Figure 20:
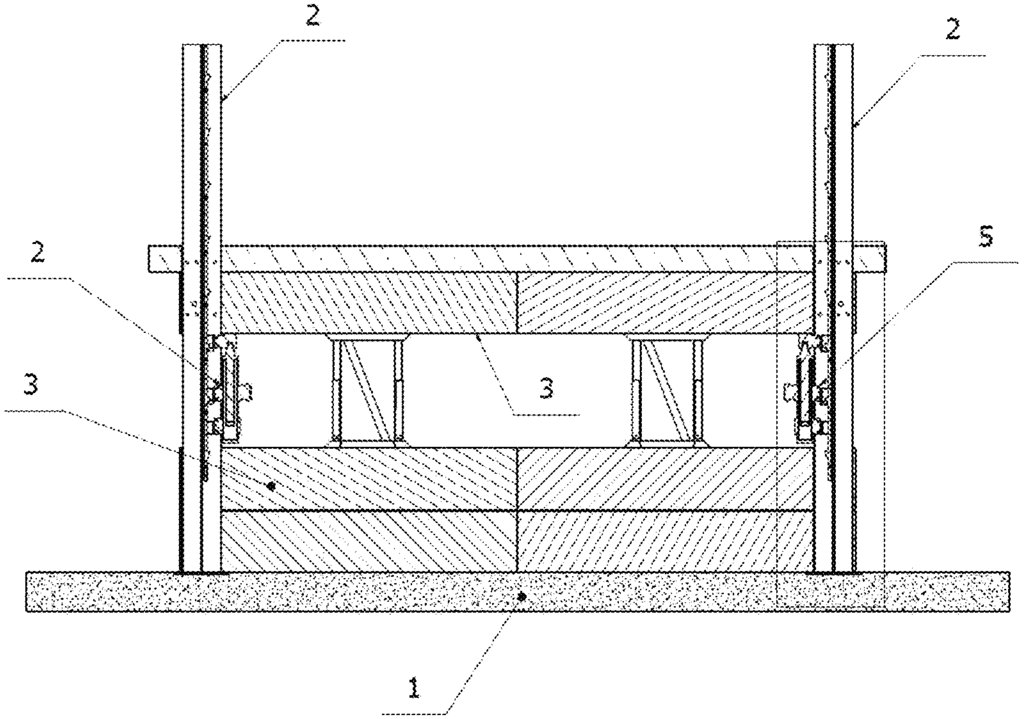
FIG. 20 is a longitudinal section view illustrating the lifting mechanism during the lifting process according to an embodiment of the present invention.
Figure 21:
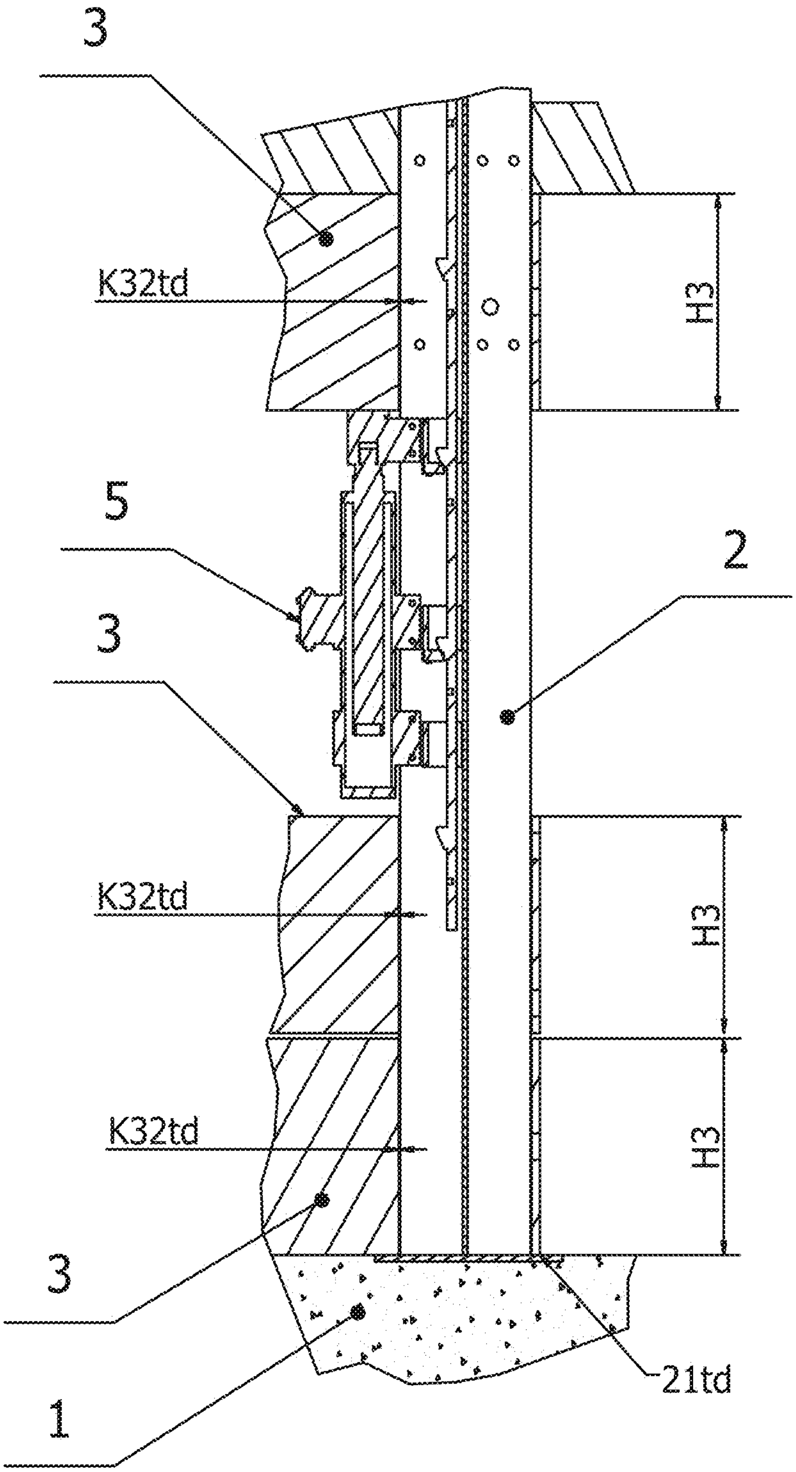
FIG. 21 is a partial section view illustrating a dynamic connection assembly between the column and the column opening.

(Refer to FIG. 20 for the details of the column-to-floor slab connections) The roof 6 is installed on top of the roof floor slab in order to avoid performing roof installation work at height. At locations where the columns extend above the roof, the roofing panels are cut to create openings for the columns to pass through. These openings are sealed after the building has been lifted into position (FIG. 12).

The hydraulic jacks 5 are operated to start lifting the roof floor slab. The jacks can be stopped at any position to facilitate the installation of systems beneath the underside of the roof floor slab (e.g. electrical wiring, sprinklers and fire water pipes, a ceiling with lighting fixtures and HVAC air diffusers, etc. (FIG. 12).

Once the designed spacing between the two floor slabs is sufficiently reached, the floor slab struts 7 are installed to connect the two floor slabs 3 together. The floor slab struts 7 are mounted inside the hollow space of the columns 2 to avoid interference with other components (FIG. 13).

Figure 14:
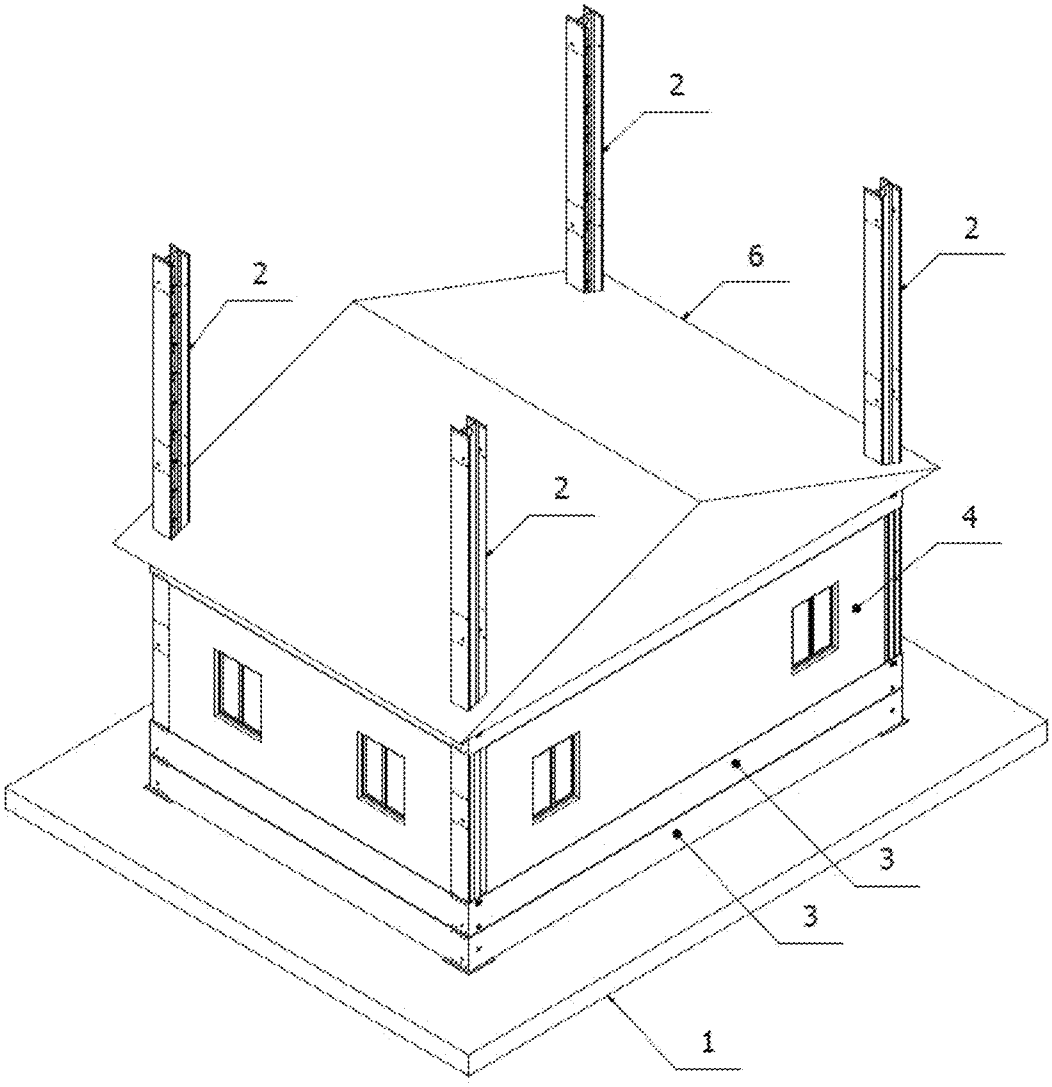
FIG. 14 is a perspective view illustrating the installation of the attic story walls and other components to complete the attic story according to an embodiment of the present invention.

The walls 4 and all story components (e.g. windows, doors, bathrooms, and interior furnishings) are installed (FIG. 14).

Figure 15:
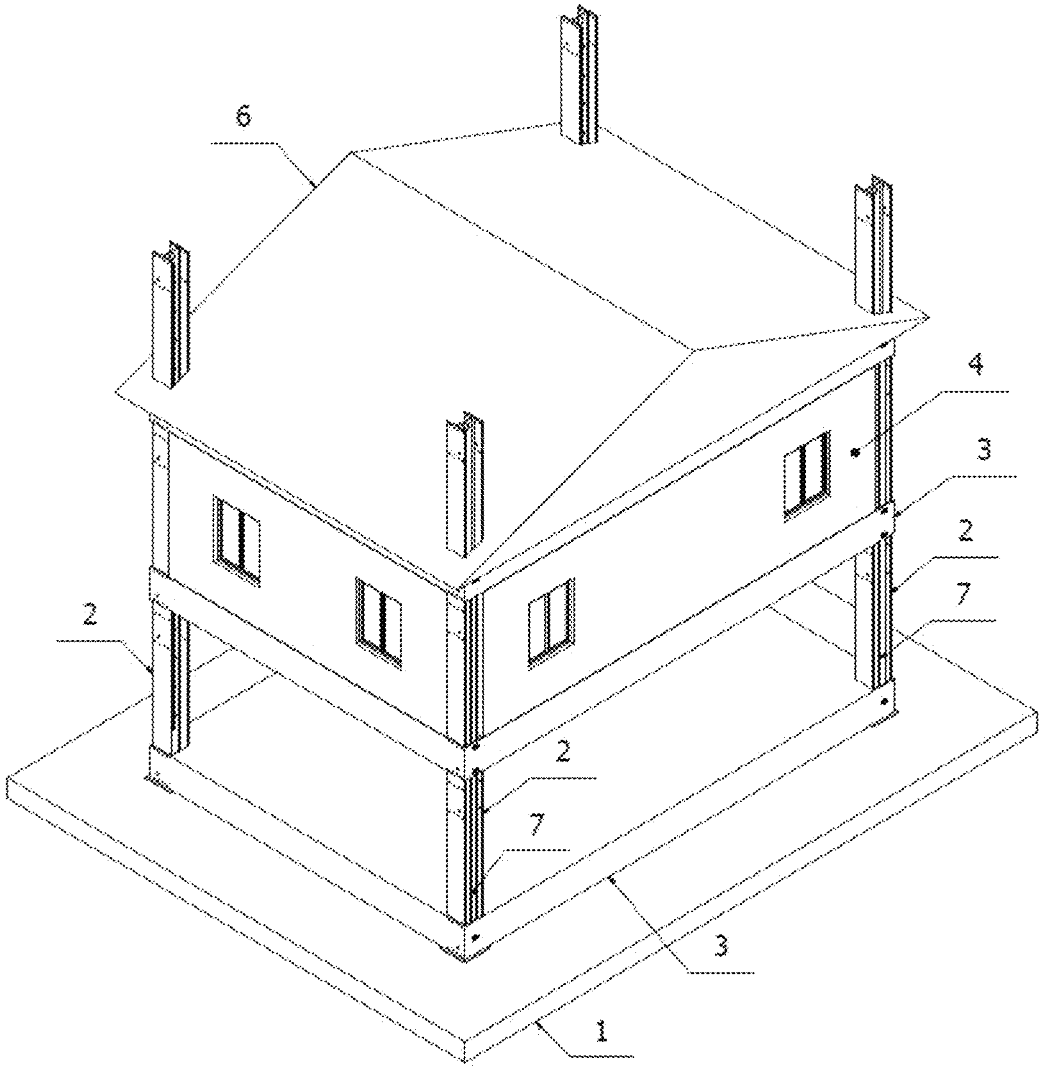
FIG. 15 is a perspective view illustrating the further lifting of the roof floor slab, thereby raising the entire preassembled components of the attic story until sufficient space is created between the attic floor slab and the lower floor slab, allowing for the installation of the floor slab struts beneath the attic story.

The hydraulic jacks 5 are further operated to continue lifting the roof floor slab. As the roof floor slab ascends, the roof floor slab simultaneously pulls up the next lower floor slab along with all previously installed components of that story (FIG. 15).

Figure 16:
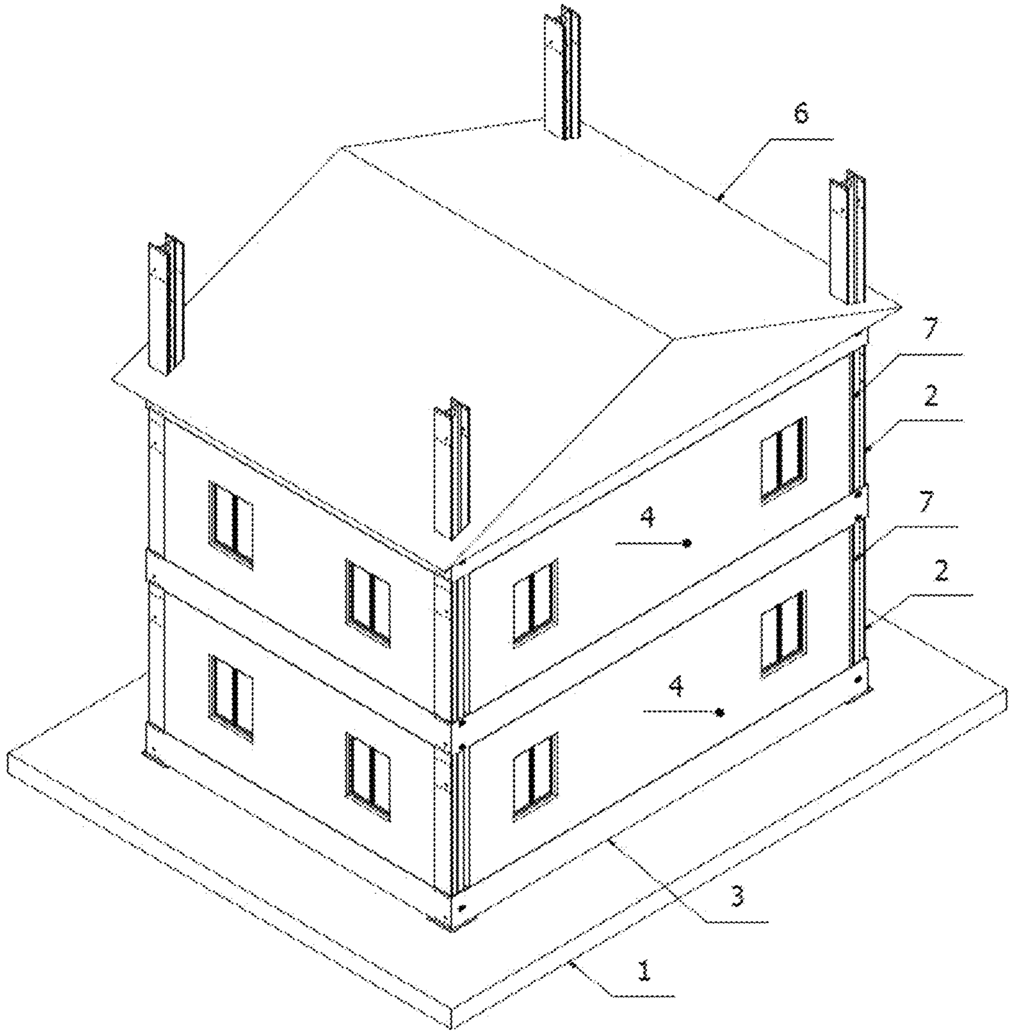
FIG. 16 is a perspective view illustrating the installation of the walls and other components of the story beneath the attic story to complete this story according to an embodiment of the present invention.
Figure 17:
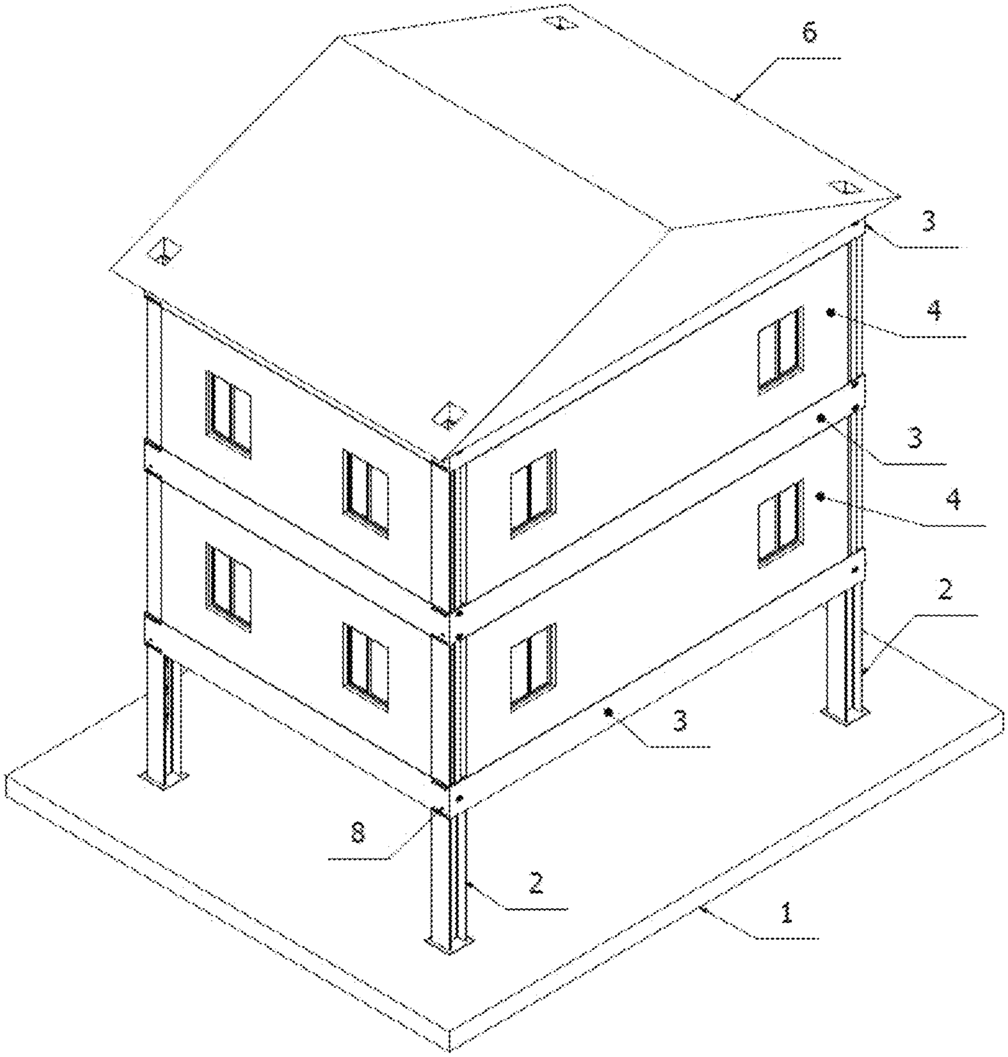
FIG. 17 is a perspective view illustrating the final lifting step to achieve the predetermined space for the first story, and the welding of the bases of the lifting columns (column bases) to the steel plates pre-installed in the foundation, according to an embodiment of the present invention.
Figure 18:
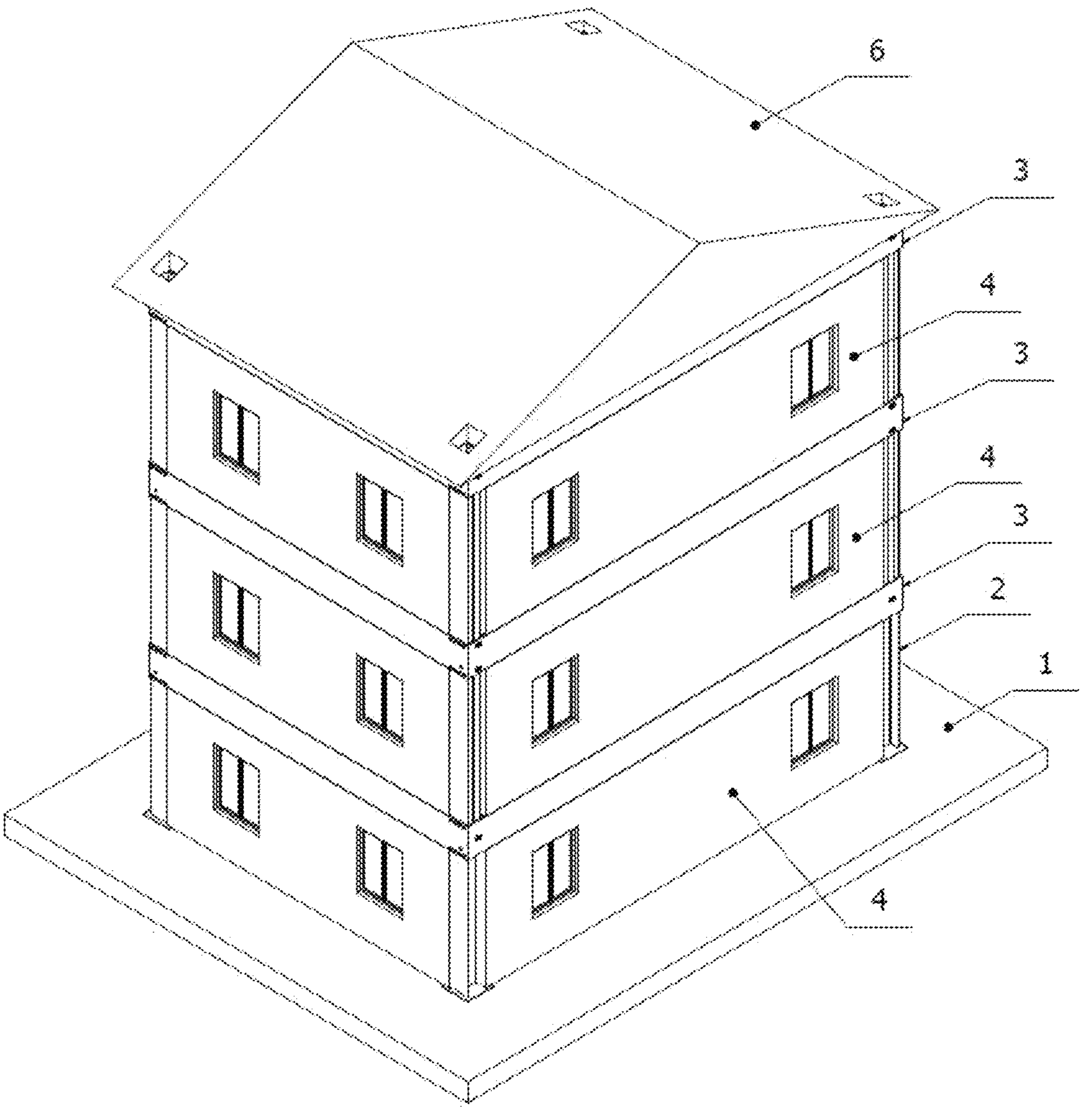
FIG. 18 is a perspective view illustrating the installation of the first-story walls and the sealing of the openings in the roof according to an embodiment of the present invention.
Figure 19:
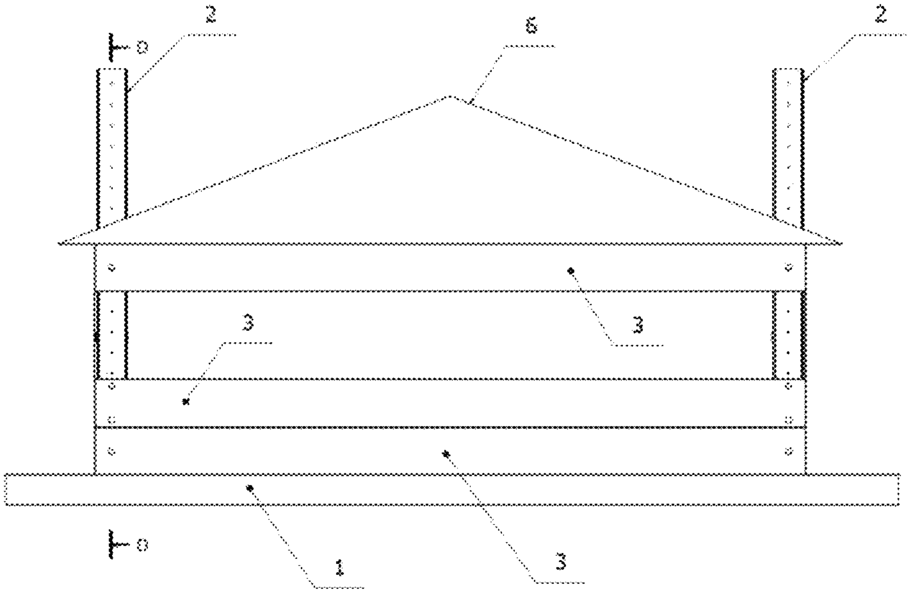
FIG. 19 is a side elevational view illustrating the lifting mechanism according to an embodiment of the present invention.

The assembly and lifting process implemented for the uppermost story is repeated for each subsequent story until all stories are lifted and assembled (FIG. 16).

After the entire building has been lifted to the designed elevation, the following steps need to be performed:

Connecting the bases of the columns 2 to the Foundation-floor slab 1 using pre-installed connections (by foundation bolts, or welding to steel plates, projecting reinforcement, etc.);

Connecting the floor slabs 3 to the columns 2 using pre-designed connections (e.g. bolts, etc.) to form a rigid fixed connection;

Connecting the floor slab 3 of the second story to the columns 2 by means of pins 8 that pass through the entire columns to resist vertical forces. In the illustrative drawings, these pins 8 are referred to as column pins;

Removing the lifting devices/hydraulic jacks 5 and the lifting rails 10;

Sealing the openings in the roof through which the columns have extended.

Figure 22:
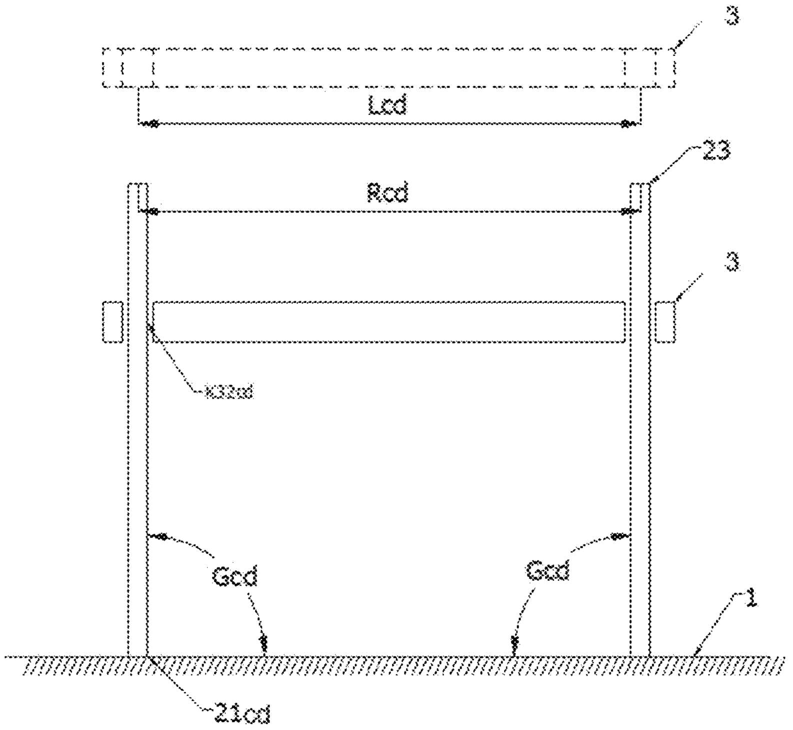
FIG. 22 (Prior Art)
FIG. 22 is a kinematic diagram illustrating a conventional lifting mechanism.
Figure 23:
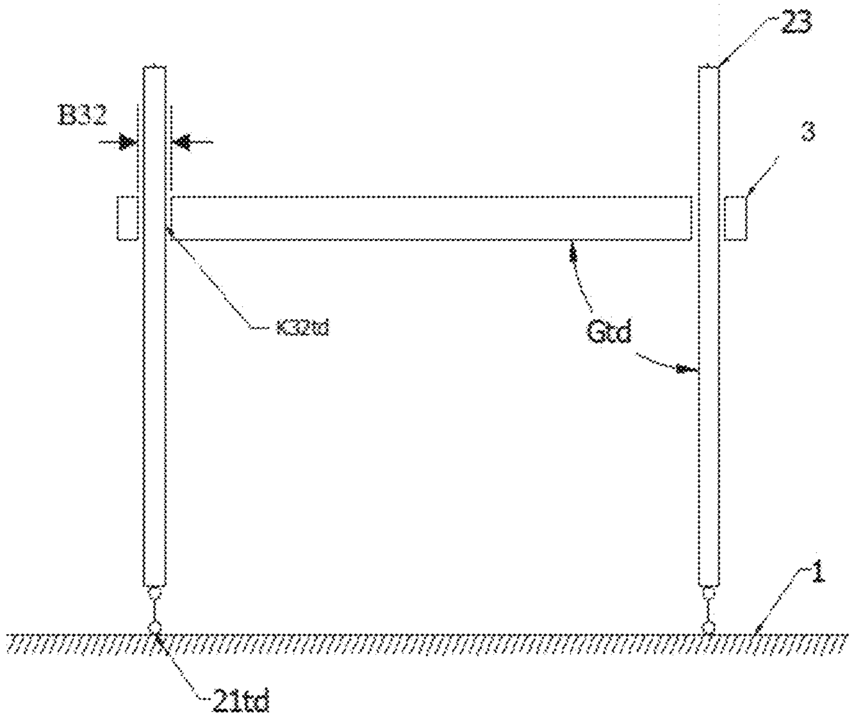
FIG. 23 is a kinematic diagram illustrating the lifting mechanism according to an embodiment of the present invention.

A simplified model is used to illustrate the differences between the present invention and other building lifting methods, as shown in FIGS. 22 and 23.

The distinguishing features that contribute to the effectiveness of the present invention compared to the prior art are that the appropriate selection of the column opening-to-column clearances K32*td* and the depth H3 of the column openings in the design (see the description of the floor slabs above) allows the lower ends of the columns not to be fixed to the Foundation-floor slab during the entire assembly and lifting process. The positions of the columns are determined by the positions of the corresponding column openings on the floor slabs. The perpendicular alignment Gtd of the columns relative to the floor slabs is determined by the values of the column opening-to-column clearances K32*td* and the depth H3 of the column openings. The verticality of the columns and the parallelism of the floor slabs to a horizontal plane depend on the elevation tolerance at the column bearing points on the foundation. The floor slabs and the columns manufactured at the factory provide favourable conditions for precision. The construction of the foundation to achieve surface elevation tolerance is also not difficult. Simply hoisting by a crane and placing the columns into the column openings are much faster and simpler than having to fix dozens of columns to ensure verticality on the Foundation-floor slab surface. Since the columns can move freely within the column openings (within the manufacturing clearances), column jamming during the lifting process is unlikely to occur, as opposed to columns rigidly fixed on a foundation when the required verticality is not achieved.

Achievable Benefits and Effects i. The on-site erection time is significantly reduced, as no time is required for vertical alignment of the lifting columns (which also serve as the building columns). The time savings also translate into cost savings.

ii. The erection process is simple. It is very easy and fast to hoist by a crane and place the columns (which also function as the lifting columns) into the column openings. The small clearance between the columns and the column openings, combined with the appropriate depth of the column openings, provides sufficient geometric rigidity for the building's load-bearing frame, without requiring rigid fixation of the columns to the foundation during erection. This simplicity eliminates the need for a large number of highly skilled workers during erection.

iii. The lifting solution employing the lifting devices according to the present invention allows the lifting to be stopped at any desired height, which enables workers to assemble structural components beneath floor slabs conveniently, without requiring ladders or scaffolding. This design results in time and labor savings during construction.

iv. Utilizing the columns as the lifting columns allows the construction equipment to be compact and lightweight. Upon completion of the lifting process, the lifting rails may be removed from the columns and reused for lifting other structures.

v. The control system of the lifting devices according to the invention is programmed using a PLC language and capable of synchronizing the strokes of all lifting devices via stroke sensors. This system allows adjustment (setting) of the stroke deviation of the hydraulic jack piston rod heads within a range from several tens of centimeters down to 1 mm. This ensures that all contact points between the jacks and the underside of the floor slabs always remain at the same height within an acceptable margin of error. As a result, deformation or twisting of the floor slabs is prevented, thereby avoiding misalignment or damage to other structural components already installed thereon (e.g., walls, doors, ceilings, etc.). However, the smaller the set stroke deviation is, the slower the lifting speed is.

Although the foregoing description and the accompanying drawings illustrate exemplary embodiments, it is to be understood that various changes, modifications, and substitutions may be made therein without departing from the scope and spirit of the invention as defined in the appended claims. In particular, one of ordinary skill in the art will readily recognize that the invention may be embodied in other specific forms, configurations, arrangements, proportions, dimensions, and with other elements, materials, and components, without departing from the essential characteristics or intent of the invention. One of ordinary skill in the art will also understand that the invention may be adapted with numerous structural variations, layouts, proportions, dimensions, materials, constituent elements, and other parameters tailored to specific environments and operational requirements, all without departing from the principles of the invention. Accordingly, the embodiments disclosed herein are to be regarded in all respects as illustrative and not restrictive, and the scope of the invention is defined by the appended claims rather than the foregoing description or specific embodiments of the present invention.

What is claimed is:

1. A hydraulic mechanism for lifting and lowering a plurality of floor slabs, comprising:

a Foundation-floor slab, columns serving as lifting columns, and the plurality of floor slabs, wherein:

the columns are inserted through openings of the plurality of floor slabs to be lifted;

lifting rails are disposed inside the columns, outer surfaces of the lifting rails are provided with step-shaped, one-way self-locking teeth for mounting hydraulic jacks;

floor slab struts are disposed within a hollow space of the columns to connect a first floor slab of the plurality of floor slabs with a second floor slab of the plurality of floor slabs to maintain a distance between the plurality of floor slabs during lifting and lowering operations, wherein, by means of the floor slab struts, when the second floor slab is lifted, the second floor slab correspondingly pulls up the first floor slab, wherein the first floor slab is lower than the second floor slab;

pins are provided to stop/hold the plurality of floor slabs at predetermined height positions on the columns;

the Foundation-floor slab is provided with steel plates at positions where the Foundation-floor slab connects to the columns.

2. A process for lifting and lowering floor slabs using the hydraulic mechanism according to claim 1, comprising the following steps:

casting concrete for the Foundation-floor slab; the steel plates are pre-installed on a foundation for later connection to the columns;

placing the plurality of floor slabs pre-fabricated at a factory, directly on the Foundation-floor slab; the plurality of floor slabs are installed in an upward sequence and stacked one on top of the other: the floor slab of a second story is placed directly on the Foundation-floor slab, the floor slab of a third story is placed directly on the floor slab of the second story, and so on; the openings of the floor slab of the second story are aligned with the steel plates pre-installed on the foundation;

placing a roof floor slab on a next lower floor slab of the plurality of floor slabs using steel support frames, to create sufficient space for installation of lifting devices and enough height to accommodate the hydraulic jacks wherein corresponding column openings of the plurality of floor slabs are coaxially aligned with each other and with intended column positions on the Foundation-floor slab;

pre-installing the lifting rails to the columns; hoisting by a crane, and placing the columns into the column openings on the plurality of floor slabs until lower ends of the columns rest on the surface of the Foundation-floor slab, wherein the lower ends of the columns are left free on the Foundation-floor slab during an entirety of the process for lifting and lowering floor slabs using the hydraulic mechanism according to claim 1;

inserting the hydraulic jacks into a space between the roof floor slab and the next lower floor slab; engaging the hydraulic jacks with the lifting rails; connecting hydraulic hoses and control cables to a control cabinet; controlling piston rod heads of the hydraulic jacks to rest on an underside of the roof floor slab; resetting stroke indicators of the hydraulic jacks to zero;

installing a roof on the roof floor slab to avoid performing roof installation work at height; at locations where the columns extend above the roof, cutting roofing panels to create openings for the columns to pass through; the openings are sealed after a building has been lifted into position;

operating the hydraulic jacks to start lifting the roof floor slab; the hydraulic jacks are configured to be stopped at any position to facilitate a installation of systems at the underside of the roof floor slab, comprising electrical wiring, sprinklers and fire water pipes, a ceiling with lighting fixtures and heating-ventilation-air conditioning (HVAC) air diffusers;

once a designed spacing between the first and second floor slabs is sufficiently reached, installing the floor slab struts to connect the first and second floor slabs together; the floor slab struts are mounted inside a hollow space of the columns to avoid interference with other components;

installing walls and story components comprising windows, doors, bathrooms, and other interior furnishings;

further operating the hydraulic jacks to continue lifting the roof floor slab such that the hydraulic jacks remain in engagement with internal channels of the columns also serving as the lifting columns to lift the roof floor slab; as the roof floor slab ascends, the roof floor slab simultaneously pulls up the next lower floor slab along with the walls and all components of lower stories;

assembly and lifting process implemented for an uppermost story is repeated for each subsequent story until all stories are lifted and assembled to construct an entire building;

connecting bases of the columns to the Foundation-floor slab using pre-installed connections by foundation bolts, or welding to steel plates, projecting reinforcement;

connecting the plurality of floor slabs to the columns using pre-designed connections by bolts or welds to form a rigid fixed connection;

connecting the floor slab, of the plurality of floor slabs, of the second story to the columns by means of pins that pass through entire columns to bear vertical forces;

removing the lifting devices/hydraulic jacks and the lifting rails;

sealing the openings in the roof where the columns have extended;

a lowering process is performed by executing the above-mentioned steps in reverse order, wherein:

the columns also serving as the lifting columns, during an erection process, are not rigidly fixed on the foundation but only rest freely on the foundation; a rigid connection of the columns to the foundation is only executed when a lifting of the plurality of floor slabs to a designed elevation has been completed;

the plurality of floor slabs are integrated with mechanical, electrical and plumbing (MEP) systems as possible, comprising the HVAC system, electrical and lighting systems, and water pipes and fire water pipes, to shorten on-site erection time.

3. The process according to claim 2, wherein to ensure a structural rigidity during the lifting process, the openings in the plurality of floor slabs where the columns pass are designed with a smallest possible clearance between the columns and the walls of the openings; each clearance is in a range of 1.5-3 mm) and a depth H3 of the openings which is a length of column segments inside the openings is suitable for a width B32 of the openings/a width of the columns, wherein a bending moment acting on the columns at the openings does not cause damage to the walls of the openings; a ratio H3/B32 is in a range of 1.5-2.

* * * * *